United States Patent [19]
Roysden, Jr.

[11] Patent Number: 5,575,576
[45] Date of Patent: Nov. 19, 1996

[54] KEYBOARD

[76] Inventor: Brunn W. Roysden, Jr., 4102 E. Palo Verde, Phoenix, Ariz. 85018

[21] Appl. No.: 166,572

[22] Filed: Dec. 13, 1993

Related U.S. Application Data

[63] Continuation-in-part of Ser. No. 939,066, Sep. 2, 1992, abandoned, which is a continuation-in-part of Ser. No. 785,799, Oct. 31, 1991, abandoned, which is a continuation-in-part of Ser. No. 528,814, May 25, 1990, abandoned.

[51] Int. Cl.$^6$ .................................................. B41J 5/10
[52] U.S. Cl. .................... 400/472; 400/486; 400/88; 341/22
[58] Field of Search .............................. 400/82, 88, 100, 400/472, 479, 485, 486, 488, 489; 200/5 A; 235/145 R, 145 A, 146; 341/22

[56] References Cited

U.S. PATENT DOCUMENTS

| | | | |
|---|---|---|---|
| 3,940,758 | 2/1976 | Margolin | 200/5 A X |
| 4,395,704 | 7/1983 | Kishimoto et al. | 341/22 X |
| 4,517,660 | 5/1985 | Fushimoto et al. | 200/5 A X |
| 4,939,514 | 7/1990 | Miyazaki | 341/22 |
| 5,212,473 | 5/1993 | Louis | 341/22 X |

OTHER PUBLICATIONS

IBM Tech. Disclosure Bulletin, vol. 27, No. 4A, Sep. 1984 "Briefcase–Portable Textwriter with 100-Key Full-Size Keyboard".

*Primary Examiner*—Christopher A. Bennett

[57] ABSTRACT

A keyboard for the input of alphanumeric data. The keyboard consists of two or more sections which can be compacted for transport by placing portions of at least one section inside another section; the keyboard can be expanded for use to permit the keyboard to take on a size and spacing corresponding to that found in a keyboard for a conventional full sized typewriter or personal computer.

22 Claims, 6 Drawing Sheets

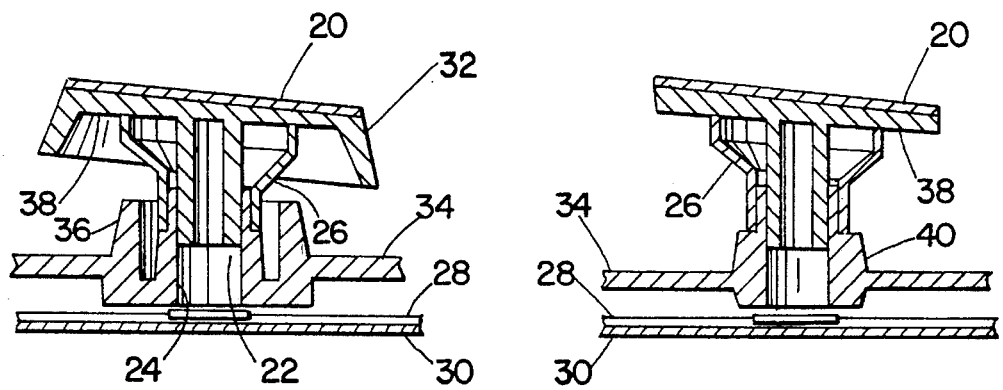
Fig. 1
(PRIOR ART)
Fig. 2
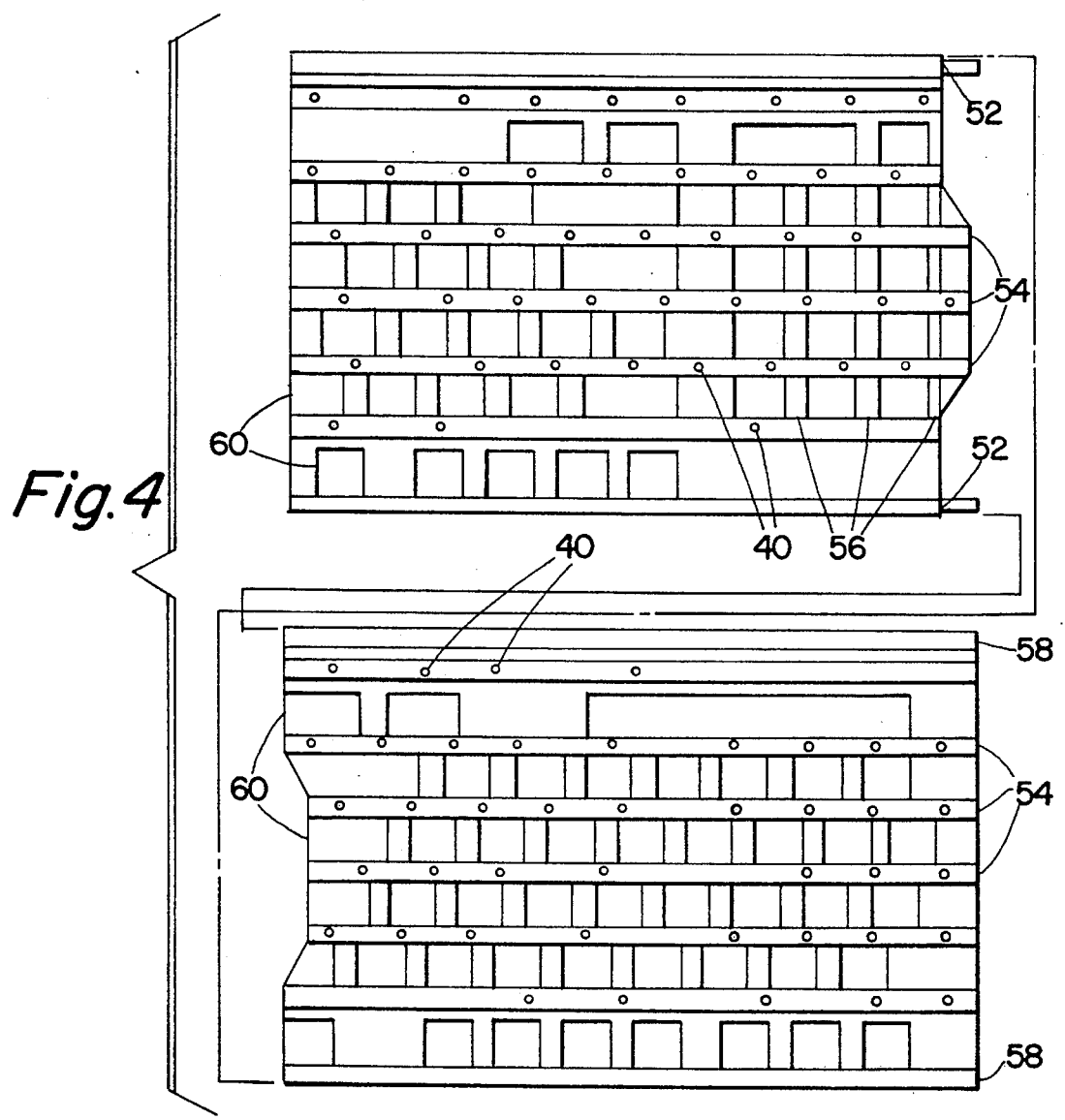
Fig. 4

KEYBOARD

CROSS-REFERENCES TO RELATED APPLICATIONS

This application is a continuation-in-part of U.S. patent application Ser. No. 07/939,066, filed Sept. 2, 1992, now abondoned, which was a continuation-in-part of U.S. patent application Ser. No. 07/785,799, filed Oct. 31, 1991, now abondoned, which was a continuation-in-part of U.S. patent application Ser. No. 07/528,814, filed May 25, 1990, now abandoned.

BACKGROUND OF THE INVENTION

1. Field of Invention

This invention relates to keyboards for typewriters, computers, calculators, telephones, and other types of equipment which utilize a keyboard for the input of alphabetic, numeric, object-specific, or other data, which can be compacted for storage and expanded for use.

2. Description of the Prior Art

More particularly, the invention relates to a modular keyboard which can be utilized with a computer, electronic typewriter, calculator, telephone, or other device (herein, for purposes of brevity, collectively designated a "computer") which uses a keyboard to input alphabetic, numeric, object-specific, or other data (herein "data"), which can provide, for example, a 101-key keyboard with three separate alphanumeric, numeric, and cursor keyboards, which can be compacted for transport, and which can be expanded for use to permit the keyboard to take on a size and spacing corresponding to that found in a keyboard for a conventional full sized personal computer.

Computers are well-known among those familiar with the art, and do not require an extended discussion here. A computer is a device which includes "a central processing unit (CPU), consisting of control and arithmetic/logic sections that processes information (data); a main memory unit . . . in which the information is held while being processed; and devices that respectively feed information into the CPU (input) and provide the user with the results of the computation (output)". The Tormont Webster's Illustrated Encyclopedic Dictionary, 1990 edition published by Tormont Publications Inc., 338 St. Antoine St. East, Montreal, Canada H2Y 1A3, page 363.

Since the CPU processes data, a CPU is, in effect, a data processor. A computer could, but is not required to have, several data processors, one of which is the CPU. Moreover, data processors would need some sort of power to operate; thus, computers would normally include a method of providing power to the data processors and other portions of the computer (e.g. batteries or an electric power line), and possibly a device that regulates the voltage supplied from power source. All of this is well known to those familiar with computers, and needs no extended discussion here.

The keyboard is primarily a data input means, although many computer keyboards also contain rudimentary data output means—e.g. l.e.d (light emitting diodes) indicating that a special key (e.g. the "Caps" key) has been pressed, and a buzzer providing cryptic warning. Other keyboards may contain additional devices, limited only by the fertile imagination of human ingenuity.

It would be perfectly possible to make a computer without a keyboard, utilizing, e.g. pens, stylus, or voice commands to input information and instructions to the processor. However, the invention described here relates only to computers which have or can have keyboards associated with them.

A keyboard contains a plurality of keys and the means of detecting which key or combination of keys have been pressed or activated, as is well known to those familiar with the art. See, e.g. patent application Ser. No. 07/939,066, which disclosure is incorporated herein by reference. The detection is transmitted, directly or indirectly, either immediately or after a pause, to a data processor (and indeed, may be transmitted to many data processors, directly or indirectly, either simultaneously or sequentially, with or without intermediate processing.) There are a variety of detection means available, as is well known to those familiar with the art, and it is not an object of this disclosure to describe all means by which keys can be activated. It is an object of this invention to describe a keyboard which will work with a wide variety of key activation and detection means, both those now known, and those which may be developed in the future. Examples of key activation and detection means using electronic circuits are described by Louis, U.S. Pat. No. 5,212,473 (1993), and Kishimoto, U.S. Pat. No. 4,395,704 (1983); See also, e.g. Margolin, U.S. Pat. No. 3,940,758 (1976), which claims an "electronic circuit" for the keyboard, but does not illustrate said circuit, presumably because such circuits are well known, and were even in 1976.

Activating a key of the keyboard of a computer can have the effect of inputting information to the computer (e.g. the next letter in this Patent Application should be a "b"), or of instructing the computer, either directly or indirectly, to process information in a certain way (e.g. print the contents of the screen; multiply the value inputted first by the value inputted second and display the product; load the word processor.)

A device need not be popularly known as a "computer" to come within the definition outlined above; thus, in the "Field of Invention", such devices are also called "typewriters . . . calculators, telephones . . . " and a "computer" may have more components than those listed above. Thus, a cellular phone typically has multiple input and output means, including, for instance, a keyboard, a means of converting between sound and electromagnetic signals, and, frequently, an LCD (liquid crystal display), together with one or more data processors, at least one of which frequently is of the type known as a "digital signal processor" or DSP. (In contrast, it would be possible to build a phone that does not fall into the definition of "computer" set out above; the sound-operated "tin-can" phone of our youth is an example.)

Many devices popularly known as "calculators" are really rudimentary computers. Indeed, Intel's 4004 computer chip, probably the first commercial integrated data processor or "computer on a chip", was originally designed to be placed in a calculator "Personal Digital Assistants", or PDAs, are a form of a computer, although many current PDAs lack integrated keyboards, largely because, until this invention, nobody knew how to build a compact, economical, reliable keyboard for PDAs on which the adult human hand could touch type. The current lack of wide-spread acceptance of PDAs in the marketplace can be placed, in the opinion of the undersigned, precisely because of the lack of a speedy, reliable input means, which this invention solves.

In conclusion, those familiar with the technology will understand what is meant by "computer" in this Application, notwithstanding that the popular nomenclature of a device may be phone, calculator, (electronic) typewriter, or something else. It is an object of this invention to describe a keyboard that will work with a variety of computers, or be a component of a wide variety of computers, both those which are currently known and those which are developed in the future.

Portable computers, calculators, typewriters, telephones, and the like are well known in the art. A principal disadvantage to such devices, portable computers in particular, is that the keyboard space on the equipment is restricted and does not permit either normal spacing between the key pads or the inclusion of the entire complement of 101 separate key pads found in the keyboard of a desk top computer. The general challenge has been known at least since the issuance of U.S. Pat. No. 3,940,758 to Margolin in 1976, who observed:

> It is evident from a glance at any pocket calculator that the minimum size of such apparatus is determined by the keyboard and by the display arrangements, not by the electronics within the device. Of the two determining factors, the keyboard occupies, by far, the greater amount of surface space.

Notwithstanding the Margolin disclosure in 1976, and in spite of subsequent disclosures, there exists today, to the knowledge of the undersigned, no commercial keyboard on the market that has full-size keys and spacing, but which can be reasonably, economically, and reliably reduced in volume and footprint for storage and transport.

Computers can be built using one "chip", and even fairly powerful ones can be built today using only a few chips and small batteries as power supplies. Further, it does not take the eye of a wizard to predict that the power available in the desk top units of today will be available in the palmtop computers of tomorrow. However, palmtop computers of today, which do have such small dimensions, use small keys, based on small spacing, with the result that the normal adult human hand cannot easily touch type with such keyboards, for the reasons mentioned above. (Or the palmtops use input devices other than a keyboard—e.g. the pen—which creates problems of their own.)

Computer displays continue to improve, with Xerox having announced a computer display comparable in pixel spacing to the dot spacing of many current laser printers. Since paper back books are a commercial success, we can suppose that a display having a size comparable to a paper back book will find a commercial market, providing that the display also has a resolution (or picture quality) comparable to the printed page.

In other words, the only restraint in producing a fully-functional pocket-sized computer is the keyboard. This notion is supported by observations of noted authorities in the field. For instance, in the article, "THE NEXT PC YOU'LL BUY", in the Mar. 13, 1990 issue of *PC MAGAZINE* the authors concluded: "Keyboard. Unless you build an ultrawide portable such as IBM's P70, you can't provide a 101-key keyboard with three separate alphanumeric, numeric, and cursor keypads."

In the Apr., 1991, issue of California Lawyer, Martin L. Dean in "LAPTOP ROMANCE" observes: "The keyboard. Until the Great Manufacturer makes our hands smaller, I know that keyboards can't be made any smaller than they are now. You just can't make keys any smaller or closer together and still type efficiently."

In the *BYTE* Special Edition, Outlook 92, on page 28, the editors observe: "The major limit to how small portables can get is the need for a keyboard". On page 194 of the same edition, Michael Nadeau, in the article "Notebooks Coming of Age" observes: "A keyboard that is less than standard width—about 11 ¼ inches—requires reducing the size of the key caps, putting them closer together, changing the layout, or doing a combination of these. . . . But on some applications, this arrangement is awkward, at best, and vendors seem to be listening."

Finally, in the August, 1993 issue of Byte Magazine, the widely-respected computer commentator (and science fiction author), Dr. Jerry Pournelle, observed:

> All of these (small computers) suffer from the same problem. It is difficult to make them small enough to carry and still have an adequate keyboard.

The operative word is "adequate"; by adequate, Dr. Pournelle makes plain that he means a keyboard upon which a normal person can touch type.

A keyboard can be made quite small. For example, some wrist watch calculators contain numerous keys which can be operated only with a stylus or other pointed instrument. For speedy input of data, however, the user needs to be able to touch type. (Touch typing is sufficiently known to those familiar with keyboards that we need not make an extended discussion here. For a discussion on touch typing, see, e.g. Lahr, U.S. Pat. No. 4,661,005 (1987), although portions of the Lahr discussion may be incorrect in light of more recent research.)

The need for the user to be able to touch type imposes requirements on the keyboard. For purposes of this disclosure, I will focus on three: the size of the key tops or key pads, the center-to center spacing of the key pads ("key spacing"), and the layout of the keys on the keyboard.

The human hand and the standard keyboard layout conspire to define the size of the keyboard which can be used by a touch-typist. The standard keyboard consists of keys with key tops or key pads nominally ½ inch (0.50") square, placed nominally on ¾ inch (0.75") centers.

The purpose of the key pad size and shape is provide to the user a secure feeling and tactile feedback that the finger is properly positioned on the key. Most computer key pads of today are square or rectangular when viewed from the top, while formerly typewriter key tops were shaped as circles or eclipses. The best keyboards have key pads that are depressed in the middle, to provide a trough in which the finger rests, and which alerts the typist through tactile feedback when the finger is positioned incorrectly.

In general, computer keys on which the user can touch type vary in width from 0.4 inch (my telephone) to 7/16 inch (0.4375") (an Apple IIGS) to ½ inch (0.50") (most IBM and Macintosh computers). For rectangular or elliptical-shaped key pads, the length of the key cap will normally be the same or slightly larger than the width (e.g. up to 0.6 inch for most current desk top computer units.)

While key pad size is important, key spacing is more important, largely because of the need of the touch-typist to rest his or her fingers on the "home row" keys. If the industry standard key spacing of ¾ inch (0.75") between centers of keys is substantially reduced, the average typist can no longer place all of his or her fingers simultaneously on the home-row keys, because the fingers of the average adult human hand will simply not fit. Thus, the average touch typist could more easily type on a keyboard with keys 0.4" square, which is approximately 0.1" less than the industry standard, providing that the key spacing was approximately 0.75" than could the typist use a keyboard having an optimum key top size with a key spacing of 0.65" (which is 0.1" less than the industry standard). Further, the typical adult cannot touch type on a keyboard with key spacing substantially smaller than 0.65", and has difficulties even with spacing that small.

A third requirement imposed on a keyboard used for touch typing involves keyboard layout. For reasons that are well known to those familiar with keyboards, keyboards have keys positioned at certain locations. In considering keyboard layout, we are concerned with both the typing efficiency afforded by certain keyboard layouts and the difficulty that touch typists have in switching between different keyboard configurations.

We may assume that keyboards basically unconstrained as to size (e.g. keyboards used with desk top units) have a key layout more convenient to use than keyboards constrained in size (e.g. most laptop units). In other words, a typist presumably can produce finished work more quickly and reliably on the 101 key unit that comes standard with the IBM desk-top unit than with the 74 to 85 key keyboard found on many laptops. If the converse were true, market forces would drive desk top units to the smaller key count configurations.

For various reasons largely having to do with the almost subconscious process of touch typing, it is profoundly difficult for a touch typing to move from a keyboard having one layout to a keyboard having a substantially different layout. Indeed, the change of even one key position (e.g. the "backslash" key used to invoke certain MSDOS commands) can break the concentration of the typist.

In summary, it is beneficial for a portable computer to have a key layout that is as close as possible to the industry standard for a desk top unit.

This is not to say that every keyboard layout should be identical. The optimum key layout may vary, depending upon such factors as the operating system or software used, the task requirements, and the training of the operator. Thus, some operators may find the Dvorak keyboard layout more attractive than the QWERTY keyboard layout; a Japanese typist using Kanji would use a key layout foreign to that of a U.S. typist; and the user of a mainframe computer may use a keyboard with more keys than a typical Apple IIe user. The gist of the discussion above is that, (1) for any one operator and application, there is probably one key layout that is optimum when the layout is not constrained by keyboard size, and (2) it is profoundly difficult for the average touch typist to switch back and forth between differing keyboard configurations.

Currently, the industry uses several tactics to attempt to circumvent this problem of reducing keyboard size, none of which is totally satisfactory. A typical laptop computer as of the date of this application is approximately 11 inches in its longest dimension. The cursor and numeric keypads are placed in a location different from those of the standard office keyboard (this is called a "non-standard layout"), and frequently require "toggle switches", in which an auxiliary key must be pressed before or in conjunction with another key to produce the desired result. For reasons discussed above, the non-standard keyboards of portable computers are more clumsy to use than a standard keyboard, with the result that the touch-typist looses speed and accuracy in using such a non-standard keyboard.

While a standard 101 key keyboard would be preferable to an 84 key keyboard of the current laptops (for an "IBM-PC compatible" type of computer), there are occasions when the advantages of a standard keyboard layout are outweighed by the advantages of obtaining a keyboard of minimum size for transportation. In other words, we may choose to accept the compromises inherent in, say, an 84 key laptop keyboard, providing we can obtain a compacted or storage size of, for example, 7 inches in its longest dimension, a size fully realizable in a computer today but for current keyboard limitations, as was discussed at the beginning of this Application.

In summary, it would be highly desirable to provide a keyboard which would, for transit or storage, occupy an area smaller than that of a conventional full sized keyboard, and which would, in use, be expandable to provide a 101-key keyboard with inter-key spacings corresponding to key spacings found on keyboards for full sized PC's. Alternatively, it would be highly desirable to provide small computers with a keyboard that would permit conventional touch-typing, such as is that found on the 84 key laptop keyboard of today, but having a largest dimension during transport substantially smaller than the current crop of laptops.

*Roylance*, U.S. Pat. No. 5,044,798, suggests that there are four groups or categories of computer keyboards that could arguably be described as compactable keyboards, 3 categories from prior art plus his own disclosure, but basically concludes that only the folding or stacked keyboard (disclosed by Margolin, supra.) and his own disclosure constitute true compactable keyboards. This disclosure relates to an improvement on the Margolin class of compactible keyboards.

Margolin describes a keyboard which is split into two or more sections, the sections then being folded or stacked on themselves for storage or transportation. While the Margolin keyboard will reduce the footprint of the keyboard during storage or transport (which may be valuable in its own right), it will not reduce the volume of the keyboard, as was observed by Roylance in his application. In other words, the stacked height of the keyboard as described by Margolin is essentially twice as thick as each section in a two-section Margolin class of keyboard, three times as thick in a three-section keyboard, etc.

In contrast, Roylance describes a keyboard in which the spacing between the keys is altered by the user, thus creating a compacted keyboard for storage by reducing the key spacing, and creating a "full-size" keyboard by increasing the spacing for operation of the keyboard. Because the approach adopted by Roylance is, by his own admission, different from that of the Margolin class of keyboards, we need not consider further the Roylance disclosure.

A purpose of this disclosure is to overcome the limitations of the Margolin keyboard. In other words, this application will describe a keyboard which is split into two or more sections, but which provides means of storing the sections in such a fashion that the total volume of the keyboard when stored is substantially less than that of the keyboard when in its operative configuration. By way of example, a two-section keyboard using this disclosure will not be twice as thick when stored as the thickness of the keyboard when in its operating configuration.

This disclosure is not limited to keyboards that are assembled for use into one substantially contiguous unit. Indeed, Margolin's first claim is one for a:

". . . keyboard arrangement including a first array of keys operative selectively on a first electronic circuit, said keyboard arrangement being physically detachable into a plurality of portions each bearing a section of said array of keys", and with, "each of said portions being adapted to electronically interconnect with adjacent keyboard portions for selective operations on said first electronic circuit."

In other words, Margolin claims a keyboard that can be split into two or more sections (portions), and the sections can be "electronically interconnect {ed} with adjacent keyboard portions".

To assure that there is no ambiguity, the "first electronic circuit" mentioned in Margolin constitutes the electronic circuit of the entire keyboard; the "array of keys" constitutes all of the keys of the keyboard; "physically detachable" means that a keyboard contains more than one section (or "portion"), and the sections (or "portions") can be physically separated from one other; the "plurality of portions" means that the sections {portions} can be separated from one another (without any description of structure which would constrain or limit that separation); the "electronically interconnected with adjacent keyboard portions" means that adjacent keyboard sections or portions are electronically interconnected, that is, the sections or portions are either connected together, or are connected, directly or indirectly, to a common element, and the connection is electronic, that is, involves an electric circuit.

Other patents have been issued for split keyboards in which the two sections would be positioned for operation in other than one substantially contiguous unit; see, e.g. Lahr, U.S. Pat. No. 4,661,005, and Ryan, U.S. Pat. No. 4,509,873.

This is not the proper venue for determining what is or is not covered by various patents for the positioning of the keyboard sections for operation in other than an essentially contiguous unit. I make no claims of innovation, positive or negative, for positioning of the keyboard sections for use. My claims involve an improvement for compacting a wide variety of keyboard configurations, whether such keyboards are patented or unpatented in their configuration for operation, and whether the precise keyboard configuration is currently known or which may be developed in the future.

SUMMARY OF THE INVENTION

The present invention is based upon the discovery that a keyboard consisting of at least two sections can be designed such that portions of the keys, key structure, and other parts of one section can fit for storage within the space between the key parts and key structure of another section, such that the total volume and footprint of the keyboard in its storage position are substantially less than those of a conventional keyboard, while providing the full size and functionality of a conventional (or even an unconventional) keyboard when the keyboard is in its operative position.

It is a principal object of the invention to provide an improved keyboard for inputting alphabetic, numeric, object-specific, or other data.

A further object of the invention is to provide a full sized 101-key keyboard for a portable computer.

A further object of the invention is to provide a computer keyboard which can be readily reduced in size for transport with a portable computer and which can then be enlarged to simulate a keyboard for a desk top computer which normally remains in a single fixed location.

A further object of this invention is to provide a computer keyboard with a readily reduced size for transport, but which be enlarged to provide a keyboard for touch-typing by normal-sized hands.

A further object of this invention is to provide a compactible keyboard for a variety of keyboard layouts, both those currently known and those that may developed in the future.

Other objects of this invention are set out elsewhere within this application.

These and other, further and more specific, objects and advantages of the invention will be apparent to those skilled in the art from the following detailed description thereof, taken in conjunction with the drawings, in which like reference characters refer to corresponding elements throughout the several views. I will describe and depict the presently preferred embodiments of the invention for the purpose of illustrating the practice thereof, and not by way of limitation of the scope of the invention.

BRIEF DESCRIPTION OF THE DRAWINGS

FIG. 1 shows the cross-section of a typical key on a membrane switch keyboard.

FIG. 2 shows the cross-section of a modified key.

FIG. 4 shows two keyboard sections with the key caps removed, revealing the perforated frame.

DESCRIPTION OF THE PREFERRED EMBODIMENTS

Figure 3:
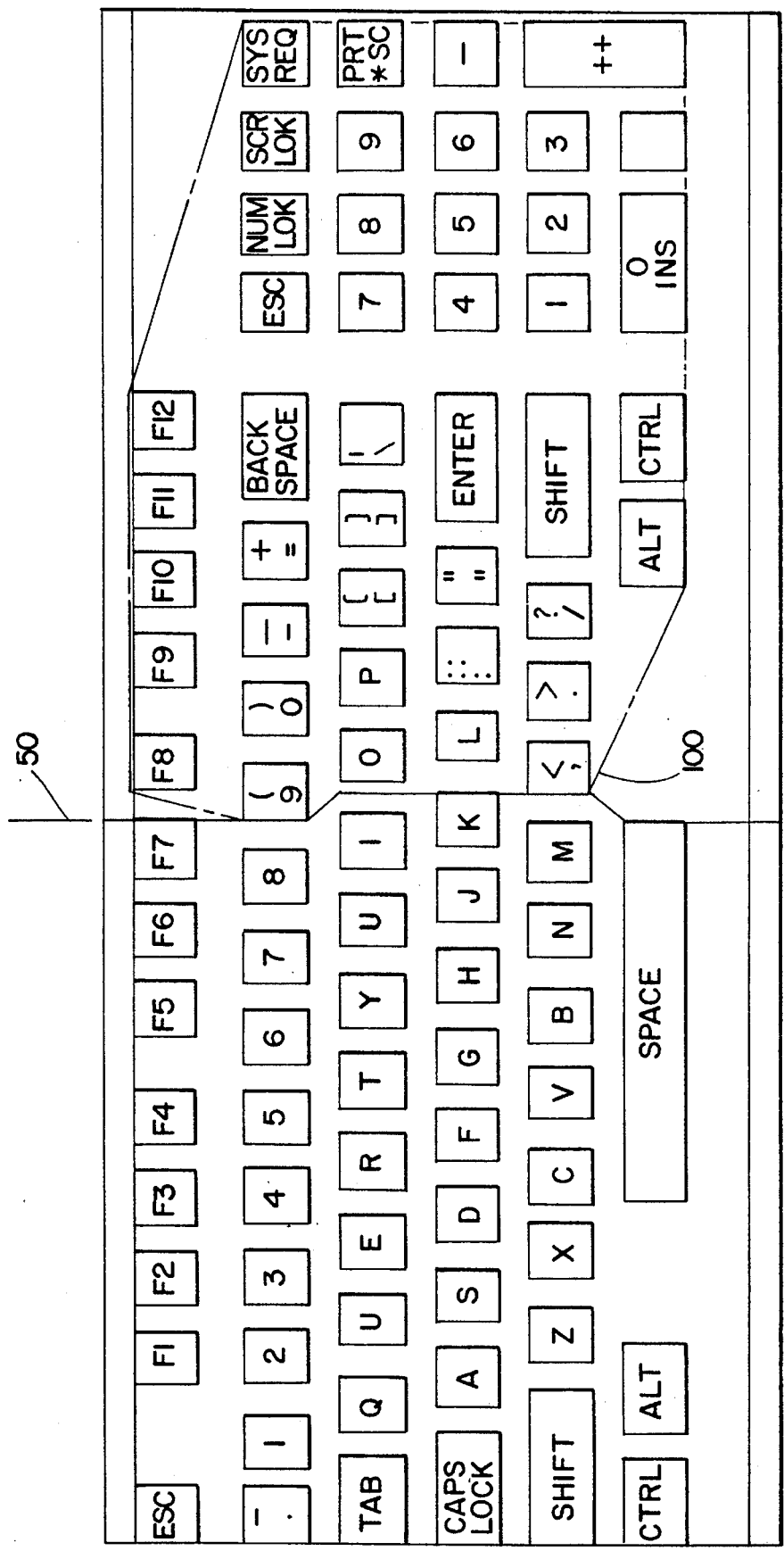
FIG. 3 shows the key cap pattern of a modified XT-type of keyboard.

Basically, a keyboard consists of a plurality of keys, a keyboard structure which holds the keys in place relative to one another and may provide some support against flexure of the keyboard, switch means which detect when a key is being pressed or activated and means of communicating this detection to the computer (the "keyboard circuit".) For keyboards or keyboard sections that are readily separable from the base unit ("detachable keyboards"), there is a keyboard housing which encloses the back, sides, and a portion of the top of the keyboard; the keyboard housing usually contains positioning means to place the keyboard at a comfortable angle to the user.

There are innumerable methods of making keys, keyboard structures, switch means, keyboard circuits, keyboard housings, and keyboard positioning means, as those familiar with the art will understand, and the illustrations described herein should not be deemed to be a limitation on how the principal disclosed here can be applied. A purpose of this invention is to describe a method of compacting a keyboard that can be applied to a wide variety of keyboard types, using a variety of keys, key caps, keyboard structures, switch means, keyboard circuits, keyboard housings, and keyboard positioning means, both those currently known and those that may be developed in the future. For purposes of illustration, we will describe a typical keyboard key using membrane switch technology, then modify the key to facilitate the invention described herein.

FIG. 1 shows the cross-section of a representative key and certain associated parts of a keyboard. (This is based upon a non-copyrighted brochure of Mitsumi entitled "THIN KEYBOARD".) The keytop or key pad is the portion pressed by the finger of the typist to activate the key. Surrounding the key pad and serving to fill up the space between keys is a key pad skirt, 32. The key pad is operationally associated with a key structure which supports the key pad and causes the key pad to move in some prescribed manner when pressed. The key structure illustrated here consists of a stem or annulus, 22, which moves inside a second annulus, basically a stem receiver, 24, when the key pad is pressed. Surrounding the stem receiver is a stem receiver reinforcement member, 36.

The "top" part of the key cap is that portion on which the finger would normally press, 20. As such, the top is a surface, not the point of highest elevation. The "bottom" of the key cap is the surface that lies under the top, and is illustrated here as 38. For purposes of orientation, the key cap will be deemed to be the "top" part of the key and keyboard section. The "bottom" or "lowest" portion of the key illustrated would be the bottom of the stem when the key is fully depressed. (Since all of the keys are illustrated in the undepressed position, the reader can assume that the bottom of the keys in the illustrations lie slightly below the lowest portion of the stem receiver.)

The key pad and stem need a means of being returned to their initial position when the key pad is released (the "key-return mechanism"). Normally, the key-return mechanism is a spring or elastomer. The key return mechanism illustrated here consists of an annular elastomer of special shape, 26. The key-return mechanism also frequently supplies certain ergonomic functions important to the user. Mitsumi calls the illustrated elastomer a "click rubber", to indicate that the finger "feels" a sort of a click when the keytop is depressed, a process that will be familiar to those knowledgeable with keyboards.

Not shown is a means of keeping the stem from slipping out of the top of the stem receiver. In the illustrated key, this consists of two prongs; one on each side of stem (oriented $90^9$ from the cross-section of FIG. 1), which prongs catch on a portion of the stem receiver reinforcement member. This will be well known to those knowledgeable in the art, and need not be further described here.

The term "key" includes those components necessary or helpful to transmit the force or movement of the typist's fingers on an individual key cap in a way that would be detected by the switch means associated with the key. For purposes of this application, this would include, where present, the key cap, skirt, stem, stem receiver, key retention mechanism, and key structure.

The volume of a key consists of the continuous, closed, three-dimensional figure with the smallest surface area that can fully enclose the components of a key. Where components not part of the key are attached to components of the key, the volume of a key is determined as if such non-key components have been severed. Where a component of a key also serves a function a part of the keyboard other than the key, then those portions of said component that are necessary for the proper functioning of the key are deemed to be a component of the key for purposes of determining the volume of the key.

In the key illustrated, the key cap and the key stem are fabricated into one piece. In some keys, the key cap has a means incorporated within the key cap to attach it to the stem or the equivalent to the stem. The term "key cap", as used here, will designate only those portions of the key cap necessary to accept the push of a finger. While the skirt, prongs, stem, stem to key cap connection means, and other such components (herein "ancillary components"), if any such ancillary components are present, may reinforce the key cap in accepting the push of a finger, such ancillary components are not deemed to be a part of the key cap.

The computer must detect when a key is pressed or activated and, additionally, when a key has been released. This function is performed by a switch means and the associated keyboard circuitry, 28. The switch means illustrated here is a membrane switch which is activated when the stem, 22, presses the membrane switch against the backing plate, 30. The backing plate illustrated here is part of the keyboard structure.

A keyboard membrane switch means would contain a plurality of membrane switches; at least one membrane switch is associated with each key. The membrane switch means also contains keyboard circuits which alerts the computer that the key pad has been pressed or released. Numerous types of switch means and keyboard circuits are known to those skilled in the art; accordingly, an extended discussion is not required here.

It is possible, and frequently desirable, to incorporate two or more of the components of a keyboard into one unit. For instance, the stem receiver described here functions both as part of the key structure and the keyboard structure, since multiple stem receivers and associated stiffening members can be molded into one monolithic (e.g. plastic) part. The stem receivers illustrated here are connected by a thin plate, called by Mitsumi a "frame", 34, said frame being part of the keyboard structure. In other types of keyboards, the key pad, stem, key return mechanism, and switch means are assembled into one package, the outside of the package being a part of the key structure; the individual keys are then assembled into one computer keyboard. In such an instance, all parts contained within said package would be deemed to be a part of the key. It is an object of this invention to describe a method of compacting a keyboard that will work with a variety of keys and key assembly techniques, both those currently known and those which may be developed in the future.

Having described, rather briefly, many of the operational parts of one form of a conventional keyboard, I can now turn to the invention claimed here. After I describe the invention in some detail, I will return to certain nuances of conventional keyboard configurations and explain how these nuances relate to the application of my invention.

The normal keyboard cannot be readily compacted (i.e. reduced in volume) even if the keyboard were made in a plurality of sections, e.g. as described by Margolin. Certain modifications should be made to the key pads, key structure, switch means, keyboard circuits, keyboard structure, or keyboard housing, or to any two or more of the above, so that portions of the keys (and possibly the keyboard structure and other components) of one keyboard section will fit between the keys of another keyboard section.

While there are a variety of methods of compacting a keyboard using my invention, I will now describe what I view as the best and most likely commercial embodiments of the invention.

In one such embodiment, the key pads, key structure, and keyboard structure are designed such that two sections slide together, with the keytops of one section moving between the keytops and the backing plate of a second section.

FIG. 2 illustrates a modification of the key illustrated in FIG. 1. The key pad skirt, 32, shown in FIG. 1, has been eliminated, and the stem receiver and stem receiver reinforcement member of FIG. 1 has been modified by increasing the size and strength of the stem receiver, 40, (herein the "modified stem receiver") and removing the stem receiver reinforcement member.

The keyboard described here would have two sections. FIG. 3 illustrates a modified "XT"-type keyboard in its operative position, in which there is a separate combined cursor and numeric pad, the modification being that the function keys are placed across the top of the keyboard instead on the left-hand side. The keyboard shown in FIG. 3 is approximately ⅔ of actual size. A dividing line, 50, shows where the two sections join. No novelty is claimed for the illustrated key layout. As was suggested above, it is an object of this invention to describe a compacting keyboard that will work with a wide variety of key layouts, both those currently known and those which may be developed in the future.

The keyboard in FIG. 3 has 6 complete "rows" of keys; the complete top row consists of the "Escape" key (labeled "Esc"), and 12function keys (labeled F1 through F12). For purposes of this application, at least two adjacent keys along a row would constitute a "row" of keys, while all of the keys along a row would constitute a "complete row" of keys.

In order to minimize the thickness of the compacted keyboard, I would perforate the frame such that the perforations, or holes, correspond to the key cap size and location of the complementary keyboard section. FIG. 4 illustrates the keyboard of FIG. 3 with the sections separated and the key caps removed. Section 1, the left section of the keyboard of FIG. 3, is shown at the top of FIG. 4; Section 2, the right section of the keyboard of FIG. 3, is shown at the bottom of FIG. 4. FIG. 4 shows the sections with the key caps removed, showing a plurality of modified stem receivers, 40, and the perforations of the frame, 60.

I am describing what I currently perceive to be the best embodiments of the invention. It is perfectly possible to build this keyboard where the frame consists essentially of longitudinal rods, 54; the cross-members of the frame, 56, being eliminated. In such an embodiment, the frame is not "perforated", but is essentially eliminated between rows of keys.

Figure 5:
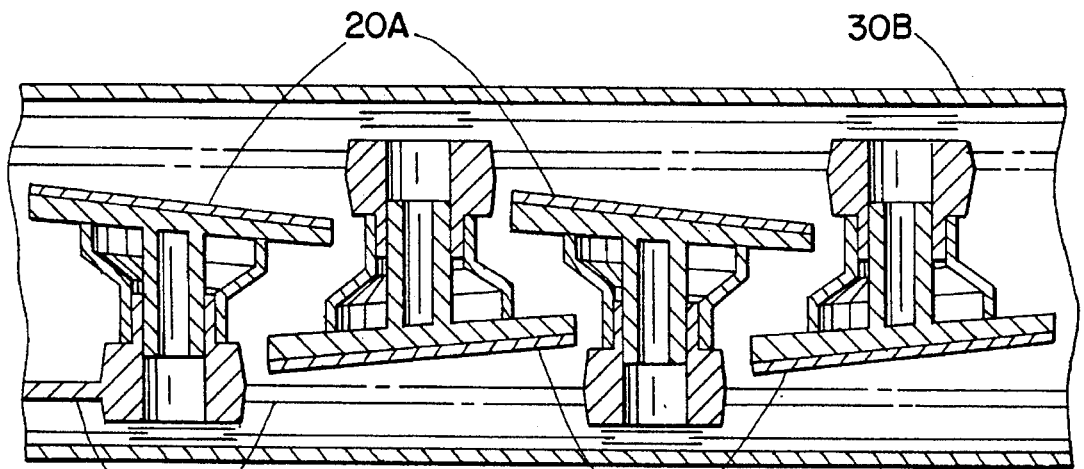
FIG. 5 shows cross-section of two keyboard sections during sliding compaction.

The keyboard is shown in FIG. 3 in an operative position. The keyboard can be compacted to its storage position as follows: Sections 1 and 2 are pulled apart; section 2 is rotated 180° around the axis defined by the row of keys (L; 'Enter 4 5 6 -). The two sections are then brought together, such that the key tops of section 2 fit between the bottom of the key tops of section 1 and the top of the frame of section 1. FIG. 5 illustrates the relationship of the sections in cross-section during the process described in the sentence above. Section 1 is shown with its backing plate, 30A, on the bottom, while section 2 is shown with its backing plate, 30B, at the top of the figure. A key cap of section 2, 20B, is shown positioned between the key caps of section 1, 20A, and the frame of section 1, 34A. The frame is shown as broken lines along most of its length, to indicate that the frame contains perforations or holes, as is described above.

Figure 6:
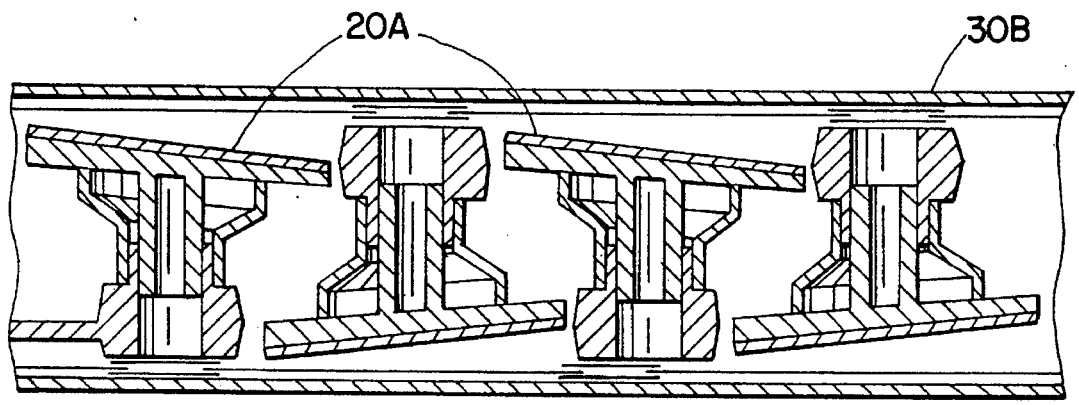
FIG. 6 shows cross-section of two keyboard sections compacted to plane of frame.

When the two sections are completely slid together, the key tops of section 1 will correspond to the perforations in the frame of section 2, and the key tops of section 2 will correspond to the perforations in the frame of section 1. By "correspond", I mean that, at this point, the backing plates of the two sections may be moved together, moving the key caps of section 1 through the corresponding perforations in the frame of section 2, and the key caps of section 2 through the corresponding perforations in the frame of section 1. This is illustrated in FIG. 6. The broken lines showing the frame have been deleted in this illustration.

Figure 7:
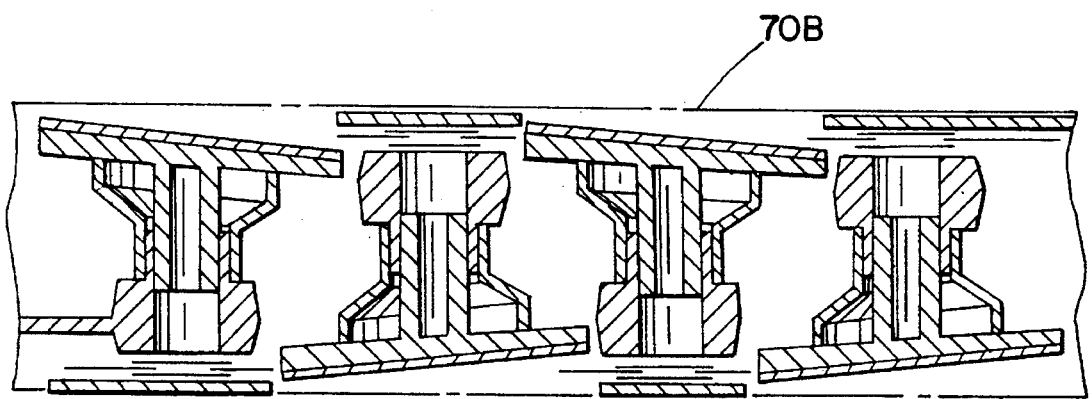
FIG. 7 shows cross-section of two keyboard sections compacted to plane of backing plate.

If the membrane switch means and backing plate of each section are also perforated in a manner similar to that described for the frame, the backing plates of each section may continue to be moved together, as is illustrated in FIG. 7. The broken line, 70A, illustrates the bottom of the backing structure of section 1, and the broken line, 70B, illustrates the bottom of the backing structure of section 2 (the "bottom" of section 2 being on top because the section has been inverted).

The result is that a keyboard of the type illustrated, with key spacing of ¾ inches (0.75"), can be compacted with a maximum dimension of 7.5 inches, with a thickness (minimum profile) of the two compacted keyboards substantially equal to the thickness (minimum profile) of either section.

Whether a commercial version of the keyboard would contain perforations in the backing plate and membrane switch means is, obviously, a design decision; I merely point out the possibilities.

The perceptive observer will notice that the row of function keys illustrated in FIG. 3 is separated further from the adjacent row of keys than are the remaining row of keys separated from each other. The reason for this, in this embodiment, is that the space bar key (and certain other large keys) have requirements in addition to those illustrated in FIG. 1 to function well, (herein, "additional key activation mechanisms"), and this layout permits greater space on the keyboard to accommodate these requirements. The additional key activation mechanisms are well known to those acquainted with keyboards, and need not be discussed further here.

In a similar vein, there are other keys with a key top greater than approximately ½ inch (0.5) by ½ inch (0.5") illustrated in FIG. 3. Some of those keys will have additional space in this layout in which the designer can incorporate additional key activation mechanisms; other of those keys will have space problems that may limit incorporation of such key activation mechanisms. This difficulty is circumvented by creating a key cap having a surface dimension of approximately ½ inch (0.5") square onto which the finger would press, and a recessed area of a larger size which is not normally touched by the finger of the operator. The computer upon which this patent application is being prepared is the original Compaq; its keyboard has only one key with a large surface area onto which the finger would normally press (the space bar), but contains several keys of the variety described in the last sentence. This will be well known to those familiar with keyboards, and need not be described further here.

To form a conventional keyboard, the two sections are moved from their storage position to their "operative position" in a manner essentially reverse to that described above.

The method of joining illustrated here is telescoping rods at the top and bottom of each section, 52, that fit into receivers of the other section, 58. A variety of methods of joining two keyboard sections will be apparent to those familiar with the art. It is an object of this invention to describe a method of compacting keyboards that would be applicable to a variety of joining methods, both those currently known and those which may be developed in the future.

The keyboard illustrated in FIG. 3 is essentially one contiguous keyboard when the sections are joined in their operative position. As was mentioned above, and will be mentioned again in conjunction with FIG. 10, a keyboard can be designed such that the operator can operate the keyboard with the two sections separated in use. I make no claims of innovation, positive or negative, for positioning of the keyboard for use. The invention here relates to means to compact at least two keyboard sections for transportation or storage (although the keyboard may be useable in the compacted position.)

For some keyboards, a connection or means of communication will have to be made between the keyboard circuits of the keyboard sections, or between the keyboard circuit of each keyboard section and the host computer. Here, I would suggest a conventional connector that attaches a multiple number of electrically conductive wires between the two keyboard sections. A variety of means of such connection will be known to those skilled in the art, including means that provide an electrical connection automatically when the two sections are joined, as well as means that require no physical touching, such as infra red light, sound waves, radio waves, and the like. The means of connection or communication need not be discussed further here. A purpose of this invention is to describe a compactible computer keyboard that would be useable with a wide variety of connections or means of communication between keyboard sections or between a keyboard section and the host computer, both those currently known and those which may be developed in the future.

The description above is that of a fairly simply, largely planar keyboard. By planar, I mean that an euclidean plane could be made to pass through all of the similar components of the keys of a section. While such keyboards exist, many keyboards incorporate more ergonomic designs, which creates the need of a more elaborate language than euclidean geometry to describe positional relationships. At this time, I will define certain geometric terms used in this application.

Figure 8:
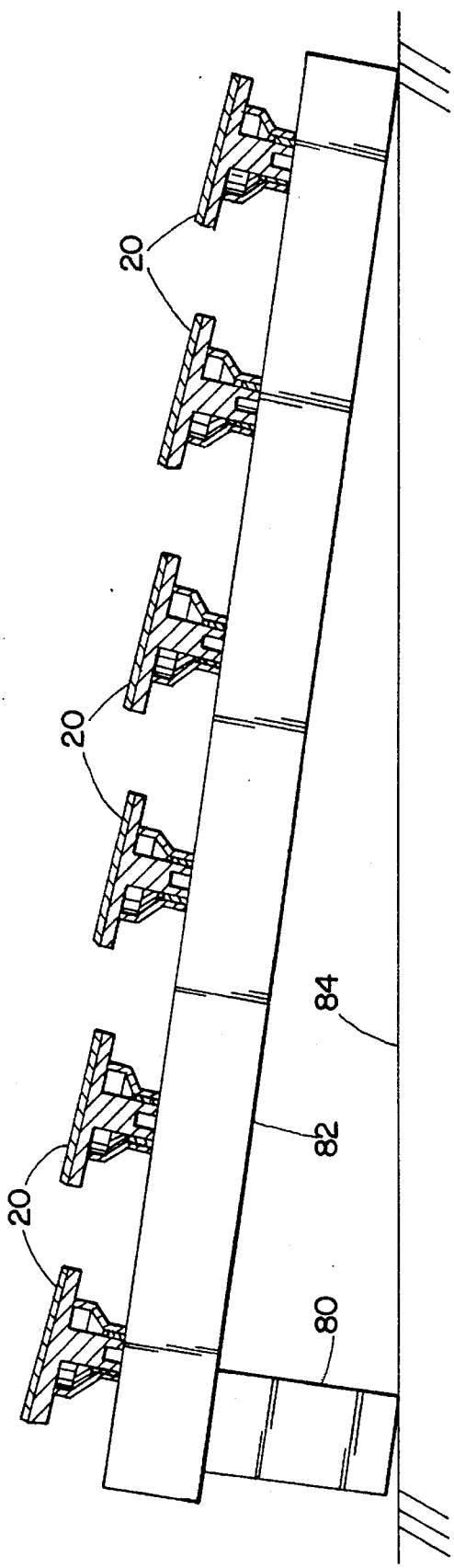
FIG. 8 shows a keyboard section in profile.

Normally, when a desktop keyboard (which is our paradigm for emulation) is placed upon a desk, the key caps of the top row of keys are generally higher than the key caps of the bottom row of keys. See FIG. 8, which shows a simplified profile of a desktop keyboard. This is accomplished either through the design of the keyboard housing or by providing a moveable component (I call them "ears") which can be pulled down to create the orientation described. Moveable ears are illustrated here, 80, which are part of the keyboard housing, 82 (shown shaded): which encloses the collection of keys. (The housing has been modified from those found on conventional keyboards, in order to facilitate the sliding compaction described earlier.) The keyboard is resting on a desk top, 84. Those knowledgeable in keyboards will understand that a variety of arrangements are possible to position a keyboard for use to ergonomic advantage. It is an object of this invention to work with a variety of keyboard orientations, both those currently known and those that may be developed in the future.

Moreover, the angle of the key cap relative to the stem may change as we move up the rows, or the key itself may be oriented at different angles to the working surface (the desktop here), to achieve ergonomic benefits. See FIG. 12. The net result is that euclidian planes cannot easily be used to describe certain surfaces. Therefore, I will have to make some definitions.

We now need to name certain boundaries, surfaces, planes, and the like. The first is the key cap boundary, defined as the line of minimum length that will fully enclose the top of the key caps of each section. (As used in this application, the term "line" includes "line segments" of less than infinite length.) I will further require that the key cap boundary touch each key cap lying along the boundary, but it will not intersect any key cap of the section. (When I say that a line, plane, or other construct will not "intersect" another line, plane, part, component, or construct, I mean that it may touch, but will not pass through, said other line, plane, part, component, or construct.) For reasons described herein, a key cap boundary need not lie along an euclidean plane. On FIG. 3, the broken line, 100 illustrates the "key cap boundary" of the right-hand section.

Figure 9:
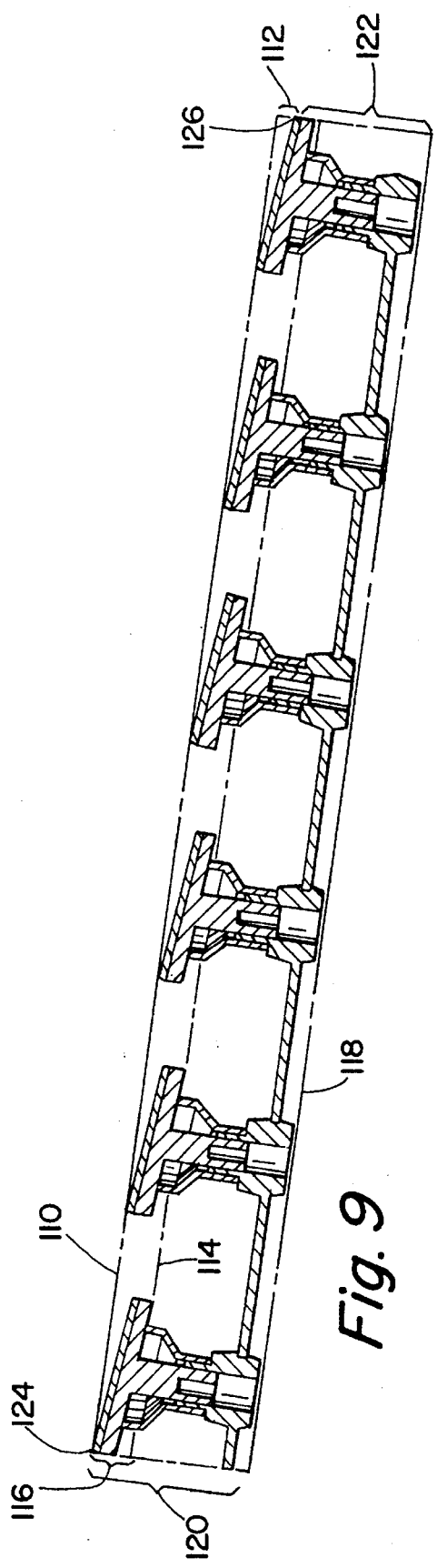
FIG. 9 shows cross-section of keyboard section, showing certain defined planes.

FIG. 9 shows a cross-section of a keyboard section, containing several rows of keys; only 1 key in each row is illustrated. Drawing an analogy from topology, if we take a rubber sheet and lay it on top of the keyboard, such that a part of the rubber sheet touches at least one part of the top of each key cap of the section, but no part of the rubber sheet intersects any key cap, and bound that rubber sheet with a projection of the key cap boundary such that the projection is perpendicular to the rubber sheet, and arrange that bound rubber sheet such that it maintains a minimum surface area, we will have defined the "upper key cap plane" for that section. Broken line 110 illustrates one line along the upper key cap plane for the keyboard illustrated in FIG. 9; line 112 shows the projection of the key cap boundary for the bottom row of keys. (For purposes of the foregoing and following discussion, I will assume that the key cap boundary touches the upper row of keys at point 124, and the lower row of keys at point 126.)

The projection of the key cap boundary onto the rubber sheet defines the "boundary of the plane" or "plane boundary".

For purposes of our discussion, our "rubber sheet" is an infinitely thin sheet—essentially a two-dimensional imaginary construct. Using topological terms from *Surface Topology*, P. A. Firby and C. F. Gardiner, Ellis Horwood Limited, Publishers, Halsted Press Paperback Edition, first published 1982, pp. 15–17, the upper key cap plane is a bounded set, since it can be placed inside a finite box, but it is not a 2-dimensional manifold, since it has a one-dimensional boundary.

Similarly, if we take our imaginary rubber sheet and arrange it such that it just touches at least one part of the bottom of each key cap, but no part of the rubber sheet intersects any key cap of the section, and bound the rubber sheet by a projection of the key cap boundary such that the projection is perpendicular to the rubber sheet, and arrange that bound rubber sheet such that it maintains a minimum surface area, we will have defined the "lower key cap plane". Broken line 114 illustrates one line along the lower key cap plane for the keyboard illustrated in FIG. 9; line 116 shows the projection of the key cap boundary for the top row of keys. Note that there is a stem involved in our illustrated key, and that the imaginary rubber sheet of our definition can intersect (i.e. pass through) the stem. Plainly, I am defining special relationships, not structure ones, and the intersection of the stem by our imaginary rubber sheet does not physically sever the stem.

Similarly, if we take a rubber sheet and arrange it such that it touches the lowest portion of each key of a section, bound the rubber sheet by a projection of the key cap boundary such that the projection is perpendicular to the rubber sheet, and arrange that bound rubber sheet such that it maintains a minimum surface area, we will have defined the "lower key plane". Broken line 118 illustrates one line along the lower key plane for the keyboard illustrated in FIG. 9; lines 120 and 122 show the projection of the key cap boundary for the upper and lower rows of keys.

I need to make one other definition before moving on to "spaces"; I will define a "pseudocylindrical surface" as the closed figure of minimum surface area having as its two edges the boundary of two bound planes.

I call it a "pseudocylindrical surface" because it is like a cylindrical surface—the lateral surface of a cylinder—except that a cylindrical surface circumscribes a circle, while the figure circumscribed by my pseudocylindrical surface need not be a circle. The terms "cylinder" and "cylindrical surface" would need no extended discussion to those familiar with the art. See, e.g. Van Nostrand's Scientific Encyclopedia, published by D. Van Nostrand Company, Inc., (New York), 14th Edition (1968) at p. 482.

Several closed 3-dimensional figures, which I will call "spaces", can now be defined. The first space is defined by two bound planes, the upper key cap plane and the lower key cap plane, with a lateral side consisting of the pseudocylindrical surface defined by the boundaries of said two planes, and is called the "section key cap space".

The second space is defined by two bound planes, the upper key cap plane and the lower key plane, with a lateral side consisting of the pseudocylindrical surface defined by the boundaries of said two planes, and is called the "section key space".

The third space is defined by two bound planes, the lower key cap plane and the lower key plane, with a lateral side consisting of the pseudocylindrical surface defined by the boundaries of said two planes, and is called the "section capless key space".

The volume enclosed by the section key space in the illustrated keyboard equals the sum of the volumes enclosed by the section key cap space and the section capless key space, because lines 116, and 120 are parallel to each other, and lines 112 and 122 are parallel to each other. It would be possible to construct a keyboard in which the comparable lines are not parallel. In such an instance, the equality mentioned at the beginning of this paragraph may not be precise, because the projection of the key cap boundary onto the various planes may define slightly different special figures, depending upon the precise configuration of the keys and the keyboard section. (In practice, the inequality would be minute, and would have no practical repercussions, but is mentioned to avoid any confusion.)

The invention involves, in part, designing a keyboard such that there are points which are common to (that is, contained within) the spaces of two sections when the keyboard is in its storage position but not when the keyboard is in expanded position.

There are smaller spaces that can be defined that will be useful in describing my invention, but before doing so, I need to describe another embodiment of the invention.

The method described above is certainly not the only method of arranging the two sections such that there are points common to the space of two sections when the keyboard is in its storage position.

Figure 10:
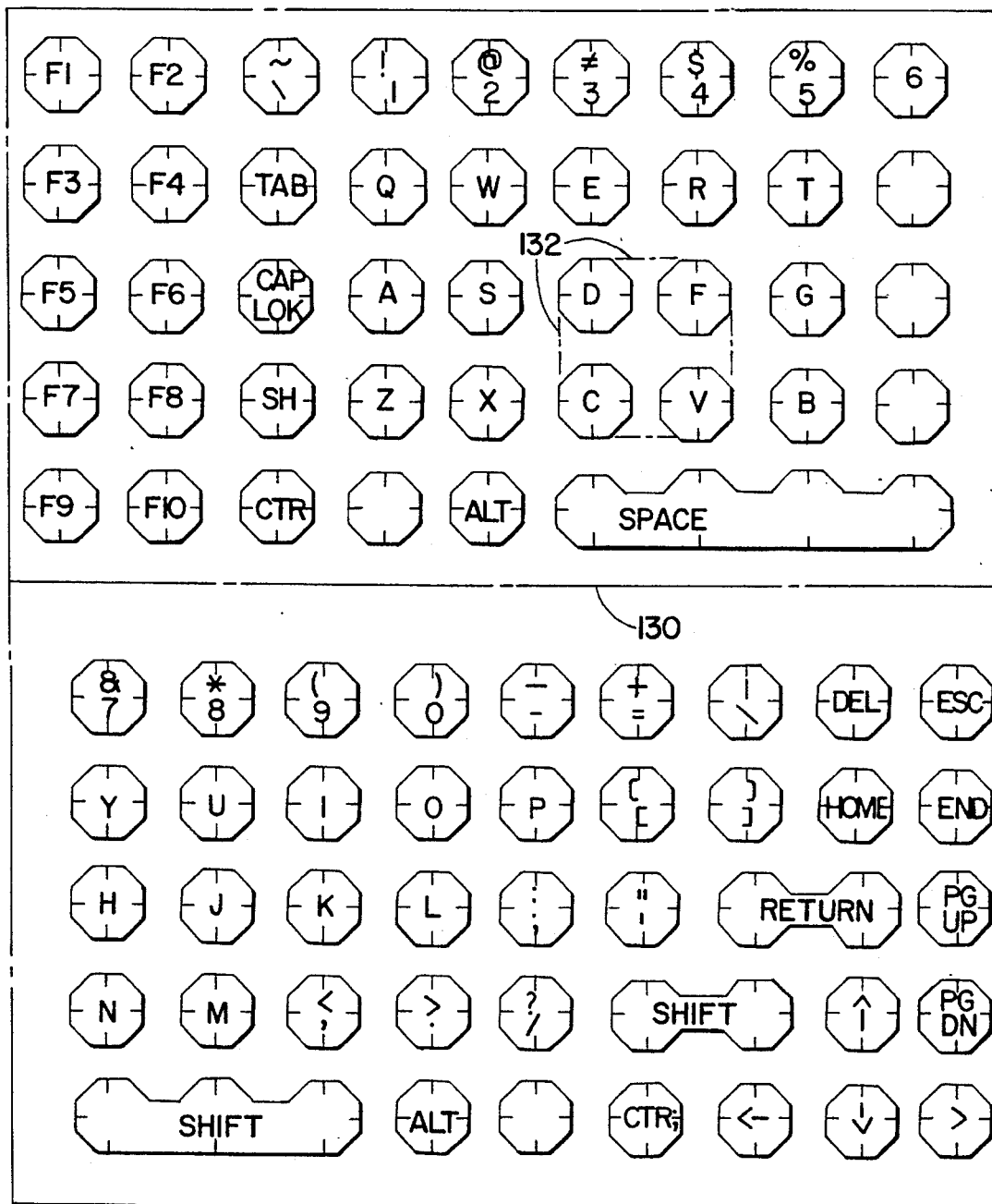
FIG. 10 shows layout of an hexagonal key cap keyboard.

Another method is to alter the size and shape of the traditional key pad so that the key caps of one section will pass through the upper key cap plane of another section. FIG. 10 shows the key cap layout of two keyboard sections, section 1 containing the keys operated by the left hand shown at the top of the illustration, and section 2 containing the keys operated by the right hand is shown at the bottom of the illustration. Each section contains a plurality of key pads having a hexagonal shape, designed such that a majority of the key pads of one section can be passed through the plane of the key pads of the second section. If the key structure and keyboard structure are suitably designed (e.g. as described above), and the backing plate (if used) is suitably perforated and the keyboard circuits are suitably formed or routed, the two sections can be compressed together, such that the total thickness of the two sections when mated is approximately the thickness of each (single) section.

To understand the principal, fold FIG. 10 along the broken line, 130. Except at the periphery, the key caps of section 2 fit between the key caps of section 1.

Note that the key layout shown in FIG. 10 includes the positioning of the function keys and cursor keys in a manner different from that shown in FIG. 3. This illustrates two points made earlier. The first is that this invention will work with a variety of key layouts. The second is that the keyboard can be designed such that the sections are not essentially contiguous when placed in their respective operative position. The key layout shown in FIG. 10 would work best having an operative position with the two sections turned at an angle to one other, or separated by some distance. The keys are not staggered, as they are in the QWERTY (left hand) section of the keyboard in FIG. 3, for the same reason that the keys on a numeric pad (the right hand portion of the keyboard in FIG. 3) are not staggered. This reason is that if the wrist is not bent to operate the keyboard, the keys do not need to be staggered.

Again, as was mentioned above, I make no claims of innovation, positive or negative, about whether the operative position of any particular keyboard comes under the claims or patents of any other keyboard design, because it is not the proper venue to do so.

The shape of the key pads shown is illustrative only, as would be familiar to those skilled in the art. It is an object of this invention to describe a method of compacting a keyboard containing a wide variety of key cap shapes, including those that are currently known and those which may be developed in the future.

The same principal could be used to press the keyboard sections face to back, providing that the backing structure of one section (if present) is perforated to permit the keys of another section to penetrate said backing structure. If a keyboard with the keys staggered were desired, this "front to back" method of compaction would probably work best. Another variation is a keyboard in which the keyboard sections are compacted back-to-back. If the "back to back" configuration were used, the "frame", 34, would probably be moved toward the key cap, and the backing plate would either be dispensed with, incorporated within the frame, or consist essentially of rods.

I mentioned earlier that a keyboard may be operable in the "storage" position. Practically, a keyboard would normally only have a portion of its keys readily operable at any one time in its storage position; exceptions include the "back-to-back" keyboard storage position described just above and the storage illustrated in FIG. 7, where conceivably an operator could operate both sides of the compacted keyboard at essentially the same time.

Figure 11:
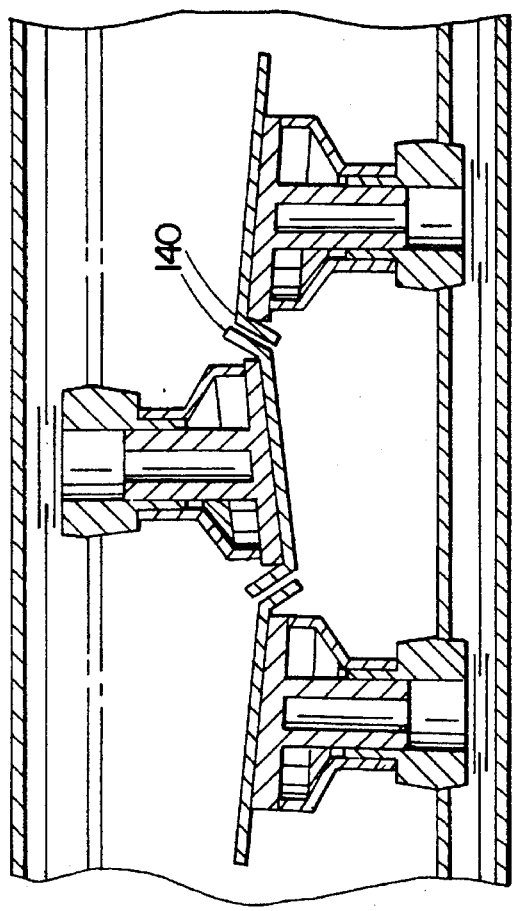
FIG. 11 shows flexible key caps during section compaction.

An alternative to changing the shape of the keys is to make a portion of the top of the key pads out of flexible or hinged material, FIG. 11, 140, so that a portion or all of the key pads of one section move when pressed through the plane of the pads of a second section. This top can be manufactured out of mylar or the key cap or a portion of the key cap can be hinged, although those skilled in the art will be aware of a variety of other materials and methods that would work with this invention. It is an object of this invention to describe a method that would work with a variety of materials and methods, both those currently known and those that may be developed in the future.

Having described other embodiments of the invention, I will now turn to defining other spaces that will be utilized in claims.

In the keyboard illustrated in FIG. 10, if the lower section is rotated around line 130 and pressed into the upper section, key cap labeled "7" will fit between four key caps, those labeled "F7", "F8", "F9", and "F10". The four keys associated with the last four key caps mentioned are called here a "bounding key set".

For purposes of this application, a bounding key set will consist of two contiguous rows of two keys each of one section. There can be many bounding key sets in any section, and any one key can be a member of several bounding key sets. Thus, for example, the "S" key cap is a member of four bounding key sets: one set consists of the "A", "S", "Z", "X" keys; another set consists of the "S", "D", "X", and "C" set; another set consists of the "Q", "W", "A", and "S" keys; the fourth set consists of the "W", "E", "S", and "D" keys.

For each bounding key set, we can define a "bounding key set upper key cap plane". We will do so by first defining a "set boundary line", consisting of the line of minimum length that will fully enclose the key caps of a bounding key set, such set boundary line touching but not intersecting each key cap in the bounding key set. Line 132 illustrates the set boundary line for the bounding key set "D", "F", "C", "V".

If we take our now familiar 2-dimensional rubber sheet and lay it on top of the key caps of the bounding key set such that a part of the rubber sheet touches a portion of the top of each key cap of the bounding key set, but no part of the rubber sheet intersects any key cap of the bounding key set, and bound that rubber sheet with a projection of the set boundary line of the set such that the projection is perpendicular to the rubber sheet, and arrange that bound rubber sheet such that it maintains a minimum surface area, we will have defined a "bounding key set upper key cap plane".

Similarly, if we take a rubber sheet and arrange it such that it just touches the bottom of each key cap of a bounding key set, but no part of the rubber sheet intersects any key cap of the bounding key set, and bound that rubber sheet by a projection of the set boundary line of the set such that the projection is perpendicular to the rubber sheet, and arrange said bound rubber sheet such that it maintains a minimum surface area, we will have defined the "bounding key set lower key cap plane".

Similarly, if we take a rubber sheet and arrange it such that it touches the lowest portion of each key of the bounding key set, bound the rubber sheet by a projection of the set boundary line of the set such that the projection is perpendicular to said rubber sheet, and arrange that bound rubber sheet such that it maintains a minimum surface area, we will have defined the "bounding key set lower key plane".

Three bounding key spaces can now be defined. The first space is defined by two bound planes, the bounding key set upper key cap plane and the bounding key set lower key cap plane, with a lateral side consisting of the pseudocylindrical surface defined by the boundaries of said two planes, and is called the "bounding key set cap space".

The second space is defined by two bound planes, the bounding key set upper key cap plane and the bounding key set lower key plane, with a lateral side consisting of the pseudocylindrical surface defined by the boundaries of said two planes, and is called the "bounding key set space".

The third space is defined by two bound planes, the bounding key set lower key cap plane and the bounding key set lower key plane, with a lateral side consisting of the pseudocylindrical surface defined by the boundaries of said two planes, and is called the "bounding key set capless space".

In general, the volume contained within the bounding key set space is approximately equal to the sum of the volumes contained within the bounding key set cap space and the bounding key set capless space.

Portions of some of the keys of one section can be placed into spaces defined above in the second section. For example, for a face-to-face insertion, some of the key caps of the bottom section of FIG. 10 can be placed within the bounding key set capless spaces of another section. (The plural is somewhat awkward; in general, only one key cap will fit into one "space" of the other section; thus several key caps will separately fit into several "spaces" of the other section.) Indeed, if the keyboard is properly formed, virtually an entire key of one section could be placed within a bounding key set space of another section, and a majority of the keys of each section could be placed within the bounding key set spaces of another section. (Not every key of a section will fit within a bounding key set space of another section, because of problems with the definition at the boundary. That is a definitional problem; the space-saving features would be obvious to those skilled in the arts, and the claims are formed to take into account this definitional difficulty.)

A reader could erroneously believe that a keyboard section would remain essentially fixed. By that, I mean that a cross-section of the keyboard would appear the same, regardless of whether the keyboard were in its storage configuration or its operating configuration. That is not necessarily true.

Figure 12:
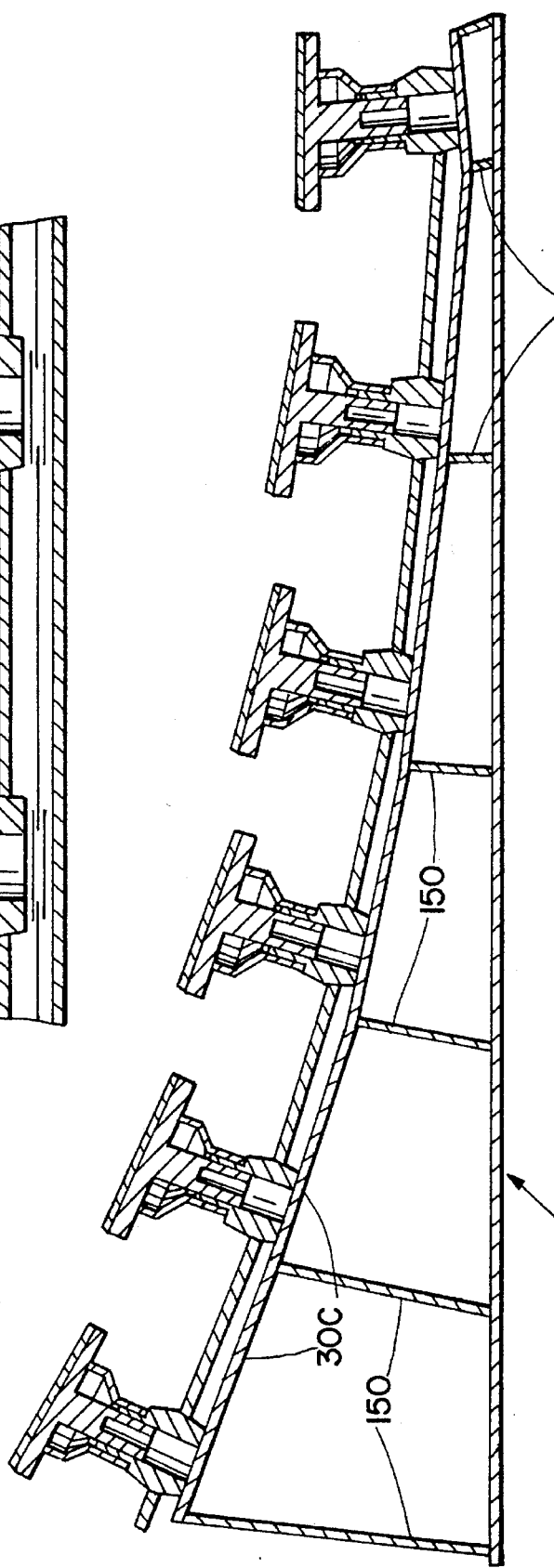
FIG. 12 shows curved keyboard.

As was mentioned above, a keyboard in cross-section may be described by curves rather than straight lines. For usage, the keyboard may have rows of keys that curve upward from an operating surface. However, that keyboard could be configured such that it is essentially flat in its storage configuration (as shown in FIG. 9), but is curved in its operational configuration (as shown in FIG. 12). I will call such a change a "change in configuration" of the keyboard. A change in configuration of the keyboard could be effected, for example, by hinged supports, 150, attached to a lower backing plate, 160, supporting a hinged or flexible upper backing plate, 30C. By "curved" I include segmented sections which approximate a curve, much as the original Ferris Wheel used straight segments to create the "curved" boundary of the wheel. FIG. 12 is illustrative of the concept, and those knowledgeable in the art can quickly conceive how this concept can be utilized in making other keyboards. Indeed, it is an object of this invention to describe how to compact keyboards which can be changed in configuration, both those currently known and those that may be invented in the future.

As was suggested previously, with this invention, it is possible to build a computer that could not be built before—a fully useable computer, with a keyboard upon which the adult human hand can comfortably and efficiently touch type, in a computer that could fit comfortably in the side suit coat pocket or a fairly small purse. Those familiar with the art would have no difficulty designing such a computer, after being advised of the keyboard disclosed herein.

Many of the keyboards described here can be manufactured using traditional techniques. The advantage of the first method described above (where the two sections are slid together during compaction) is that it permits use of a key top similar in size and shape to those of a current desktop computer keyboard; the advantage of the second method (exemplified by the hexagonal key caps) is that the two sections can be more quickly compacted and protracted; the method of the flexible key caps attempts to obtain the advantages of both the first and second methods. What is, in fact, best will be worked out in the market place; there may well be a place for a variety of compacting keyboards using the invention described here.

Least there be any doubt about the efficiency of the sliding method of keyboard compaction, I fabricated a wooden model of a keyboard to illustrate certain principals of the design first described, (but without operational keys); the sections can be moved from their compacted position to their operative position in approximately three (3) seconds. While a commercial version of such a keyboard may contain stops, guides, reinforcing members, and the like, such details would be well known to those skilled in the art and need not be discussed further here.

By way of information, the model (demonstrating the concept illustrated in FIGS. 3–7), when compacted, is approximately 5 3/8 inches (5.375") by 7 3/8 inches (7.375"). A keyboard of the type shown in FIG. 10 would be approximately 4 inches by 7 inches when compacted. The difference in size in caused primarily by the different key layout configurations; both illustrate the remarkable compaction possible with this invention.

I claim:

1. A keyboard, for inputting data, including at least two keyboard sections, a first section and a second section, each such section including
   a. a keyboard section structure, and
   b. a plurality of keys, including at least one BOUNDING KEY SET, each such BOUNDING KEY SET consisting of two rows of two keys each, each key within said plurality of keys including
      i. a key cap which is used to activate said key, and
      ii. switch means associated with said key,
   c. a SECTION KEY SPACE, consisting of the space contained between two bound planes, the upper key cap plane of said section and the lower key plane of said section, with a lateral side consisting of the pseudocylindrical surface defined by the boundaries of said two planes, and
   d. a SECTION CAPLESS KEY SPACE, consisting of the space contained between two bound planes, the lower key cap plane of said section and the lower key plane of said section, with a lateral side consisting of the pseudocylindrical surface defined by the boundaries of said two planes, and
   in which said keyboard sections can be arranged in at least two positions,
   one a keyboard-operative position in which said sections can be arranged such that the keys of said sections can be used to input data, and
   the other a keyboard-storage position,
   in which the claimed improvement includes means, for each key within said BOUNDING KEY SET of said first section, for placing the key cap of said key within said SECTION KEY SPACE of said second section.

2. A keyboard of the type of claim 1, including means, for each key within said BOUNDING KEY SET of said second section, for placing the key cap of said key within said SECTION KEY SPACE of said first section.

3. A keyboard of the type of claim 1, including means, for a majority of said plurality of keys of said first section, for placing the key caps of said keys within said SECTION KEY SPACE of said second section.

4. A keyboard of the type of claim 3, including means, for a majority of said plurality of keys of said second section, for placing the key caps of said keys within said SECTION KEY SPACE of said first section.

5. A keyboard of the type of claim 1, including means, for each key within said BOUNDING KEY SET of said first section, for placing the key cap of said key within said SECTION CAPLESS KEY SPACE of said second section.

6. A keyboard of the type of claim 5, including means, for each key within said BOUNDING KEY SET of said second section, for placing the key cap of said key within said SECTION CAPLESS KEY SPACE of said first section.

7. A keyboard of the type of claim 5, including means for placing the key caps of a majority of said plurality of keys of said first section within said SECTION CAPLESS KEY SPACE of said second section.

8. A keyboard of the type of claim 7, including means for placing the key caps of a majority of said keys plurality of keys of said second section within said SECTION CAPLESS KEY SPACE of said first section.

9. A keyboard, for imputting data, including at least two keyboard sections, each such section including
   a. a keyboard section structure, and
   b. a plurality of keys, including at least one BOUNDING KEY SET, each such BOUNDING KEY SET consisting of two rows of two keys each, each key within said plurality of keys including
      i. a key cap which is used to activate said key, and
      ii. switch means associated with said key,
   c. at least one BOUNDING KEY SET SPACE, each such BOUNDING KEY SET SPACE defined by a BOUNDING KEY SET of said section, said BOUNDING KEY SET SPACE consisting of the space contained between two bound planes, the bounding key set upper key cap plane of said BOUNDING KEY SET and the bounding key set lower key plane of said BOUNDING KEY SET, with a lateral side consisting of the pseudocylindrical surface defined by the boundaries of said two planes, and
   d. at least one BOUNDING KEY SET CAPLESS SPACE, each such BOUNDING KEY SET CAPLESS SPACE defined by a BOUNDING KEY SET, said BOUNDING KEY SET CAPLESS SPACE consisting of the space contained between two bound planes, the bounding key set lower key cap plane of said BOUNDING KEY SET and the bounding key set lower key plane of said BOUNDING KEY SET, with a lateral side consisting of the pseudocylindrical surface defined by the boundaries of said two planes, and
   in which said keyboard sections can be arranged in at least two positions,
   one a keyboard-operative position in which said sections can be arranged such that the keys of said sections can be used to input data, and
   the other a keyboard-storage position,
   in which the claimed improvement includes means, for each key within said BOUNDING KEY SET of said first section, for placing the key cap of said key within a BOUNDING KEY SET SPACE of said second section.

10. A keyboard of the type of claim 9, including means, for each key within said BOUNDING KEY SET of said second section, for placing the key cap of said key within a BOUNDING KEY SET SPACE of said first section.

11. A keyboard of the type of claim 9, including means, for a majority of said plurality of keys of said first section, for placing the key cap of each such key within a BOUNDING KEY SET SPACE of said second section.

12. A keyboard of the type of claim 11, including means, for a majority of said plurality of keys of said second section, for placing the key cap of each such key within a BOUNDING KEY SET SPACE of said first section.

13. A keyboard of the type of claim 9, including means, for each key within said BOUNDING KEY SET of said first section, for placing the key cap of said key within a BOUNDING KEY SET CAPLESS SPACE of said second section.

14. A keyboard of the type of claim 13, including means, for each key within said BOUNDING KEY SET of said second section, for placing the key cap of said key within a BOUNDING KEY SET CAPLESS SPACE of said first section.

15. A keyboard of the type of claim 13, including means, for a majority of said plurality of keys of said first section, for placing the key cap of each such key within a BOUNDING KEY SET CAPLESS SPACE of said second section.

16. A keyboard of the type of claim 15, including means, for a majority of said plurality of keys of said second section, for placing the key cap of each such key within a BOUNDING KEY SET CAPLESS SPACE of said first section.

17. A keyboard, for imputting data, including at least two keyboard sections, a first section and a second section, each such section including a. a keyboard section structure, and b. a plurality of keys, including at least one BOUNDING KEY SET, each such BOUNDING KEY SET consisting of two rows of two keys each, each key within said plurality of keys including
 i. a key cap which is used to activate said key, and
 ii. switch means associated with said key, c. at least one BOUNDING KEY SET SPACE, each such BOUNDING KEY SET SPACE defined by a BOUNDING KEY SET of said section, said BOUNDING KEY SET SPACE consisting of the space contained between two bound planes, the bounding key set upper key cap plane of said BOUNDING KEY SET and the bounding key set lower key plane of said BOUNDING KEY SET, with a lateral side consisting of the pseudocylindrical surface defined by the boundaries of said two planes, in which said keyboard sections can be arranged in at least two positions, one a keyboard-operative position in which the sections can be arranged such that the keys of said sections can be used to input data, and the other a keyboard-storage position, in which the claimed improvement includes means, for each key within said BOUNDING KEY SET of said first section, for placing a majority of the volume of each such key within a BOUNDING KEY SET SPACE of said second section.

18. A keyboard of the type of claim 17, including means, for each key within said BOUNDING KEY SET of said second section, for placing a majority of the volume of each such key within a BOUNDING KEY SET SPACE of said first section.

19. A keyboard of the type of claim 17, including means, for a majority of said plurality of keys of said first section, for placing a majority of the volume of each such key within a BOUNDING KEY SET SPACE of said second section.

20. A keyboard of the type of claim 19, including means for a majority of said plurality of keys of said second section, for placing a majority of the volume of each such key within a BOUNDING KEY SET SPACE of said first section.

21. A keyboard arrangement including a first array of keys operative selectively on a first electronic circuit, said keyboard arrangement being physically detachable into a plurality of keyboard portions each such keyboard portion bearing a section of said array of keys and each of said keyboard portions bearing a section of said electronic circuit, each of said keyboard portions being adapted to electronically interconnect with adjacent keyboard portions for selective operations on said first electronic circuit, in which the claimed improvement includes means for placing at least 50% of the space encompassed by the SECTION KEY SPACE of one detachable portion of said keyboard, said SECTION KEY SPACE consisting of the space contained between two bound planes, the upper key cap plane of said section and the lower key plane of said section, with a lateral side consisting of the pseudocylindrical surface defined by the boundaries of said two planes, within the SECTION KEY SPACE of another detachable portion of said keyboard.

22. A computer in which the claimed improvement includes a keyboard as in any one of the preceding claims.

* * * * *